US008010317B1

(12) United States Patent
Pennanen et al.

(10) Patent No.: US 8,010,317 B1
(45) Date of Patent: Aug. 30, 2011

(54) SYSTEM AND METHOD FOR PROVIDING HARDWARE PERFORMANCE MONITORS FOR ADAPTIVE VOLTAGE SCALING WITH A PLURALITY OF $V_T$ LOGIC LIBRARIES

(75) Inventors: Juna Pennanen, Oulu (FI); Pasi Salmi, Kemi (FI)

(73) Assignee: National Semiconductor Corporation, Santa Clara, CA (US)

( * ) Notice: Subject to any disclaimer, the term of this patent is extended or adjusted under 35 U.S.C. 154(b) by 1186 days.

(21) Appl. No.: 11/712,709

(22) Filed: Mar. 1, 2007

(51) Int. Cl.
G06F 11/30 (2006.01)
(52) U.S. Cl. ............... 702/182; 702/79; 702/82; 702/89; 702/107
(58) Field of Classification Search .............. 702/79, 702/82, 89, 107, 182; 324/207.12, 657; 323/300, 323/282, 268
See application file for complete search history.

(56) References Cited

U.S. PATENT DOCUMENTS

| | | | |
|---|---|---|---|
| 6,405,353 B1 | 6/2002 | Maheshwari | |
| 6,708,312 B1 | 3/2004 | Chiang et al. | |
| 6,868,503 B1 | 3/2005 | Maksimovic et al. | |
| 6,900,478 B2 | 5/2005 | Miyagi | |
| 7,030,661 B1 | 4/2006 | Doyle | |
| 7,106,040 B1 | 9/2006 | Maksimovic et al. | |
| 7,117,378 B1 | 10/2006 | Maksimovic et al. | |
| 7,120,804 B2 | 10/2006 | Tschanz et al. | |
| 7,289,921 B1 | 10/2007 | Salmi et al. | |
| 7,479,768 B1 | 1/2009 | Salmi | |
| 7,581,120 B1 * | 8/2009 | Hartman et al. | 713/300 |

OTHER PUBLICATIONS

Dong et al., 'Low Power Signal Processing Architectures for Network Microsensors', 1997, ACM Publication, pp. 173-177.*
Liu, 'Multi-voltage Adaptive Voltage Scaling SoC Reference Design', Nov. 2006, National Semiconductor Corporation, pp. 1-8.*
Hiroshi Okano, et al., "Supply Voltage Adjustment Technique for Low Power Consumption and its Application to SOCs with Multiple Threshold Voltage CMOS", 2006 Symposium on VLSI Circuits Digest of Technical Papers, 2 pages.
Jianfeng Huang, et al., "Power optimization in data-path scheduling and binding with multiple supply voltages and threshold voltages by simulated annealing", 2005 IEEE, p. 1370-1374.
Sandeep Dhar, et al., "Closed-Loop Adaptive Supply Voltage Scaling Controller for Low-Power Embedded Processors", 2005 IEEE Region 5 and IEEE Denver Section Technical, Professional and Student Development Workshop, p. 6-11.
W. Hung, et al., "Total Power Optimization through Simultaneously Multiple-VDD Multiple-VTH Assignment and Device Sizing with Stack Forcing", ISLPED '04, Aug. 9-11, 2004, p. 144-149.

(Continued)

Primary Examiner — Michael P Nghiem
Assistant Examiner — Elias Desta

(57) ABSTRACT

A system and method is disclosed for providing a plurality of hardware performance monitors for adaptive voltage scaling in an integrated circuit system that comprises a plurality of threshold voltage $V_T$ logic libraries. Each hardware performance monitor is associated with one of the plurality of threshold voltage $V_T$ logic libraries and provides a signal that measures a performance of its respective threshold voltage $V_T$ logic library die temperature, process corner and supply voltage. The difference between the measured performance and a nominal expected performance for each hardware performance monitor is determined. The largest of the plurality of difference signals is selected and provided to an advanced power controller for use in providing adaptive voltage scaling for the integrated circuit system.

20 Claims, 5 Drawing Sheets

OTHER PUBLICATIONS

Anirban Basu, et al., "Simultaneous Optimization of Supply and Threshold Voltages for Low-Power and High-Performance Circuits in the Leakage Dominant Era", DAC 2004, Jun. 7-11, 2004, p. 884-887.

S. Thompson, et al., "Dual Threshold Voltages and Substrate Bias: Keys to High Performance, Low Power, 0.1 μm Logic Designs", 1997 Symposium on VLSI Technology Digest of Technical Papers, p. 69-70.

A. Bassi, et al., "Measuring the effects of process variations on circuit performance by means of digitally-controllable ring oscillators", 2003 IEEE, p. 214-217.

Mark Hartman, et al., "System and Method for Providing Multi-Point Calibration of an Adaptive Voltage Scaling System", U.S. Appl. No. 11/134,997, filed May 23, 2005.

* cited by examiner

SYSTEM AND METHOD FOR PROVIDING HARDWARE PERFORMANCE MONITORS FOR ADAPTIVE VOLTAGE SCALING WITH A PLURALITY OF $V_T$ LOGIC LIBRARIES

TECHNICAL FIELD OF THE INVENTION

The present invention relates generally to low power integrated circuits and, more particularly, to low power integrated circuits that employ adaptive voltage scaling and operate with a plurality of threshold voltage $V_T$ logic libraries.

BACKGROUND OF THE INVENTION

Modern digital integrated circuits such as central processing units (CPUs) are typically capable of operating with several different clock frequencies. Assume that a CPU can reduce its clock frequency while still meeting the processing requirements of an application that is running on the CPU. As is well known, a reduction in the clock frequency of the CPU proportionally reduces the CPU power consumption. With a lower clock frequency less power is consumed because there are fewer signal level changes within a given time period.

As is also well known, the power consumption of a digital circuit is quadratically proportional to the operating voltage. Therefore, decreasing the voltage level of the operating voltage (i.e., the supply voltage) and reducing the clock frequency can provide significant power savings in a digital circuit.

Dynamic Voltage Scaling (DVS) is a power management technique in which pre-determined voltage values (within a voltage table) are used for each requested operating clock frequency of a CPU. The voltage levels that are defined in the voltage table must be carefully selected in order to adequately cover all process and temperature corners so that the CPU will function correctly at each clock frequency.

Adaptive Voltage Scaling (AVS) is a power management technique in which the supply voltage of a digital integrated circuit is adjusted automatically. The supply voltage is adjusted using closed loop feedback to a minimum level that is required for the proper operation of the integrated circuit at a given clock frequency.

The major difference between Dynamic Voltage Scaling (DVS) and Adaptive Voltage Scaling (AVS) is that the Adaptive Voltage Scaling (AVS) automatically measures variation of the process and temperature in order to balance the supply voltage and system delay (digital cell delay) that is due to closed loop feedback. This means that the supply voltage in the AVS system is automatically reduced at lower temperatures and for faster silicon. As the supply voltage is reduced, the power consumption is also reduced.

FIG. 1 illustrates a block diagram of an embodiment of an exemplary prior art Adaptive Voltage Scaling (AVS) system 100. AVS system 100 comprises a System-on-a-Chip (SoC) unit 110 and an Energy Management Unit (EMU) 120. The System-on-a-Chip (SoC) unit 110 comprises a Clock Management Unit (CMU) 130, a Variable Voltage Domain CPU System 140, a Hardware Performance Monitor (HPM) 150, and an Advanced Power Controller (APC) 160. The Hardware Performance Monitor (HPM) 150 is located within the Variable Voltage Domain CPU System 140.

The Clock Management Unit (CMU) 130 receives a system clock signal from a system clock unit (not shown in FIG. 1). The Clock Management Unit (CMU) 130 provides clock frequencies for the central processing unit (CPU) (also not shown in FIG. 1). The Clock Management Unit (CMU) 130 also provides clock frequencies for the Hardware Performance Monitor (HPM) 150. The clock frequencies that are provided to the Hardware Performance Monitor (HPM) 150 are represented by the designation HPM CLOCK.

The Hardware Performance Monitor (HPM) 150 tracks gate delays in the current operational conditions. The CPU system and the Hardware Performance Monitor (HPM) 150 are in the Variable Voltage Domain CPU System 140. The Hardware Performance Monitor (HPM) 150 outputs a performance code to the Advanced Power Controller (APC) 160. The performance code indicates the propagation delay of digital gate cells. The Advanced Power Controller (APC) 160 processes the delay data and requests appropriate changes to the supply voltage.

The Advanced Power Controller (APC) 160 is coupled to and communicates with the Energy Management Unit (EMU) 120. In one embodiment the coupling between the Advanced Power Controller (APC) 160 and the Energy Management Unit (EMU) 120 is a PowerWise® interface (PWI). The mark PowerWise® is a registered trademark of the National Semiconductor Corporation. The Advanced Power Controller (APC) 160 sends a request to the Energy Management Unit (EMU) 120 to change the supply voltage. The Energy Management Unit (EMU) 120 provides the requested supply voltage level to the System-on-a-Chip (SoC) 110. The adjustable supply voltage from the Energy Management Unit (EMU) 120 is designated $V_{AVS}$ in FIG. 1.

The operating system of a modern central processing unit (CPU) may support a real time scheduling of performance levels. Each performance level may have associated with it a specific value of operating clock frequency. The operating system is capable of selecting an operating clock frequency for which the CPU performance is minimized on a real time basis and for which the deadlines of a particular application are still met. For example, while an MPEG4 movie encoding application is running, a performance scheduling algorithm of the operating system may predict and change the performance level of the CPU in ten millisecond (10 ms) intervals.

The Hardware Performance Monitor (HPM) 150 tracks gate delays in the current operational conditions. The Hardware Performance Monitor (HPM) 150 outputs a performance code to the Advanced Power Controller 160. The performance code indicates the propagation delay of digital gate cells. In particular, Hardware Performance Monitor (HPM) 150 sends the performance code to the Advanced Power Controller 160. The Advanced Power Controller 160 then subtracts the performance code from a standard Reference Calibration Code (RCC) to obtain an error signal.

The error signal is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to a Compensation Unit (not shown) within the Advanced Power Controller 160. Based on the value of the Slack Time error signal, the Compensation Unit sends a signal to the Energy Management Unit (EMU) 120 to cause the Energy Management Unit (EMU) 120 to adjust the value of the adjustable output voltage ($V_{AVS}$) of Energy Management Unit (EMU) 120.

Modern System-on-a-Chip (SoC) digital logic circuits may consume large amounts of power both in terms of leakage power and dynamic power. Leakage power is the power that is consumed when no switching activity occurs within the logic circuitry. Dynamic power is the power that is consumed by the logic circuitry to alter its internal states (e.g., charging and discharging internal nodes).

In deep-submicron complementary metal oxide semiconductor (CMOS) processes it is known that the leakage power represents a significant amount of power consumption in System-on-a-Chip (SoC) digital logic circuitry. Therefore, it is highly desirable to be able to minimize the leakage power that is consumed. The leakage power in a logic circuit such as a NAND circuit or a NOR circuit depends upon the physical properties of the transistors that are used to implement the logic circuit.

To a first order approximation the threshold voltage ($V_T$) of a transistor determines the leakage properties of a transistor. The greater the threshold voltage $V_T$ of a transistor, the lower the leakage power that is consumed by the transistor. The relationship between the threshold voltage $V_T$ and the leakage power is exponential. This feature gives high threshold voltage transistors (high $V_T$) much lower leakage than those transistors with a low threshold voltage (low $V_T$).

Unfortunately, the speed of logic circuitry that is implemented with high $V_T$ transistors is less than the speed of logic circuitry that is implemented with low $V_T$ transistors. The speed of the logic circuitry and the leakage power properties must be traded off against each other in System-on-a-Chip (SoC) design.

In a complex System-on-a-Chip (SoC) there are hundreds of thousands of logic signal paths between storage elements such as latches and flip-flops. For a complex System-on-a-Chip (SoC) system to operate at a given clock frequency all signals have to propagate across the combinatorial logic between the storage elements in one clock cycle.

Because there are large numbers of logic paths it is also natural that not all paths are equal. The logic function of a path may be simple and require only a few gates. This type of path will be particularly fast. Other types of paths may be quite complex and consume a great deal of time. These types of paths will be particularly slow. The long (and slow) paths are called "critical paths" because the delay through them defines the maximum clock speed of the System-on-a-Chip (SoC) and therefore the quality of performance of the chip.

Modern synthesis tools take advantage of the fast paths that exist in an integrated circuit design by slowing them down by replacing fast high-leakage logic circuits (that have low $V_T$) with slow low-leakage logic circuits (that have high $V_T$). In this manner the average leakage power in an integrated circuit design is reduced without reducing the maximum performance of the design (which is still defined by the critical paths implemented with the fast high-leakage logic circuits).

The implementation of a System-on-a-Chip (SoC) integrated circuit design that reduces the average leakage power in the manner described uses both low $V_T$ components and high $V_T$ components. This type of implementation comprises (1) some logic paths that are "critical" and that contain only fast, low $V_T$ logic circuitry, and (2) some logic paths that are "least critical" and that contain only slow, high $V_T$ logic circuitry, and (3) some logic paths that contain both fast, low $V_T$ logic circuitry and slow, high $V_T$ logic circuitry.

When a closed loop adaptive voltage scaling system of the type illustrated in FIG. 1 minimizes the supply voltage, both the dynamic power and the leakage power are minimized. The expression for the power of the System-on-a-Chip (Soc) is given by the expression:

$$P = \alpha C V^2 f_{CLK} + V I_L \qquad \text{Eq. (1)}$$

P is the total power of the SoC. Alpha ($\alpha$) is a switching activity factor. Alpha ($\alpha$) represents the percentage of nodes that are switching at each clock cycle. C is the node capacitance inside the SoC. The expression $f_{CLK}$ is the SoC clock frequency. V is the supply voltage. The expression $I_L$ is the leakage current. Equation (1) assumes rail-to-rail switching for the CMOS logic.

As previously described, Hardware Performance Monitor (HPM) 150 shown in FIG. 1 produces an output code that is relative to the propagation speed of the signals inside the logic of the System-on-a-Chip (SoC) 110. FIG. 2 illustrates one possible prior art implementation 200 of the Hardware Performance Monitor (HPM) 150. This implementation 200 comprises a ring oscillator 210 and a counter 220. The ring oscillator 210 provides an output clock signal to the counter 220. The counter 220 receives a sample and reset signal and generates a sensor output signal.

FIG. 3 illustrates another possible prior art implementation 300 of the Hardware Performance Monitor (HPM) 150. This implementation 300 comprises a tapped delay line that comprises a signal source 310, a plurality of logic elements (320a, 320b, 320c) and a sample and code output word unit 330. The logic elements (320a, 320b, 320c) provide input to the sample and code output word unit 330. The sample and code output word unit 330 receives a sample signal and generates a sensor output signal.

The ring oscillator implementation 200 of the Hardware Performance Monitor (HPM) 150 is able to produce a digital output code that is relative to the speed of the logic that is used to implement the ring oscillator implementation 200. The tapped delay line implementation 300 of the Hardware Performance Monitor (HPM) 150 is able to produce a digital output code that is relative to the speed of the logic that is used to implement the tapped delay line implementation 300.

In both types of implementation of the Hardware Performance Monitor (HPM) 150 several factors affect the output from the Hardware Performance Monitor (HPM) 150. These factors include the semiconductor manufacturing process, the logic library that is used, the die temperature and the supply voltage. It is possible to use either implementation 200 or implementation 300 (or both) to implement Hardware Performance Monitor (HPM) 150 (and an adaptive voltage scaling system) of the type shown in FIG. 1.

In a conventional adaptive voltage scaling system, the arrangement that is shown in FIG. 1 works very well. All logic is implemented with a standard logic cell library having a single threshold voltage $V_T$ level for all of the PMOS transistors and all of the NMOS transistors. For convenience of description we will refer to this conventional arrangement as a single $V_T$ library and the resulting design as a single $V_T$ design.

In a single $V_T$ design all signal paths consist of logic cells from the single $V_T$ library. When the supply voltage of the logic is changed, the delay of all the logic cells is changed by the same fraction. For example, a logic path with two successive inverters will have twice the delay compared to a logic path with a single inverter (assuming the same drive and the same load for the inverters). It is possible to describe the frequency-optimal supply voltage characteristic of a System-on-a-Chip (SoC) with a single curve. In addition, in a single $V_T$ design, process and temperature variation maintain the relative relationships between different delay paths.

In a design that has a plurality of $V_T$ domains (often referred to as a multi $V_T$ design), the relationship of the various logic paths is much more complex. Because different logic paths may contain logic cells from different libraries, the behavior of each $V_T$ library across the supply voltage affects the delay behavior of each logic path differently.

The delay of a logic cell is related to the threshold voltage $V_T$ of the transistors inside the logic cell in a non-linear manner. The logic cells with high $V_T$ transistors will have a much larger relative delay increase with the same amount of supply voltage change than the same logic cell when implemented with low $V_T$ transistors. For this reason one can no longer claim that the delay of an inverter is always half of the delay of two consecutive inverters if the inverters are from different $V_T$ logic libraries.

FIG. 4 illustrates a graph 400 of supply voltage (V) versus operating frequency in megaHertz (MHz) for a dual $V_T$ design. A dual $V_T$ design is a multi $V_T$ design that has two values of $V_T$. The first $V_T$ value is designated as the low $V_T$ value and the second value of $V_T$ is designated as the high $V_T$ value.

The letters "DFS" in the expression "DFS frequency" in FIG. 4 stand for Dynamic Frequency Scaling. The voltage-frequency characteristics of a dual $V_T$ design (that has both low $V_T$ logic cells and high $V_T$ logic cells) can be bounded by two curves. The upper curve 410 represents the high $V_T$ transistor logic curve and the lower curve 420 represents the low $V_T$ transistor logic curve.

If the design used only high $V_T$ logic, then the upper curve 410 would completely characterize the design. If the design used only low $V_T$ logic, then the lower curve 420 would completely characterize the design. The behaviors of all of the "mixed" paths inside the design are between the upper curve 410 and the lower curve 420.

It is important to note that the upper curve 410 and the lower curve 420 intercept at a point that is designated as the "design target point". The design target point is typically the slow-slow corner fro both high $V_T$ and low $V_T$. This is the operating voltage at which the System-on-a-Chip (SoC) is designed to operate at a certain frequency. The synthesis and timing analysis tools will balance all logic paths at this frequency so all critical high $V_T$ and low $V_T$ paths are equal. But as soon as the voltage (and frequency) is decreased, the difference between the two $V_T$ logic libraries becomes apparent.

Additional complexity is introduced by process and temperature variation on the System-on-a-Chip (SoC). Manufacturing inaccuracies may cause shifts in the $V_T$s of a logic library. In addition, ambient temperature differences and System-on-a-Chip (SoC) self heating may cause temperature changes on the die. Both of these mechanisms may cause variation in the characteristic curves of the design. FIG. 5 shows the impact of process variation on a dual $V_T$ System-on-a-Chip (SoC) design.

FIG. 5 illustrates a graph 500 of supply voltage (V) versus operating frequency in megaHertz (MHz) for a dual $V_T$ design. FIG. 5 illustrates how much change is needed to compensate for the process and temperature variance of high $V_T$ logic paths and low $V_T$ logic paths at each operating frequency (clock frequency).

The upper curve 510 represents the high $V_T$ transistor logic curve. The dotted lines (520 and 530) on the sides of curve 510 illustrate how much change is needed to compensate for the process and temperature variance of the high $V_T$ logic paths. The lower curve 540 represents the low $V_T$ transistor logic curve. The dotted lines (550 and 560) on the sides of curve 540 illustrate how much change is needed to compensate for the process and temperature variance of the low $V_T$ logic paths.

The presently existing adaptive voltage scaling (AVS) approach is well adapted to handle a single logic library with a single $V_T$ and consistent behavior in a System-on-a-Chip (SoC). The problem is that a modern System-on-a-Chip (SoC) may have a plurality of logic cell libraries with different $V_T$s. Therefore, there is no single characteristic curve for all of the logic paths. There is no single Hardware Performance Monitor (HPM) that could model the System-on-a-Chip (SoC) for the Advanced Power Controller (APC). The situation is especially complex near the "design target point" where any cell library (regardless of its $V_T$) may form the "critical path" in some process corner.

A Hardware Performance Monitor (HPM) that has a mixed construction (i.e. some logic cells from all different $V_T$ libraries) would not solve the problem. This is because such a Hardware Performance Monitor (HPM) would only average the characteristic curves of the libraries and would not accurately predict any actual operating points for the System-on-a-Chip (SoC).

Therefore, there is a need in the art for a system and method that is capable of efficiently providing an accurate adaptive voltage scaling (AVS) system for a System-on-a-Chip (SoC) that operates with a plurality of threshold voltage $V_T$ logic libraries.

SUMMARY OF THE INVENTION

To address the above-discussed deficiencies of the prior art, it is a primary object of the present invention to provide a system and method for efficiently providing an accurate adaptive voltage scaling (AVS) system for a System-on-a-Chip (SoC) that operates with a plurality of threshold voltage $V_T$ logic libraries.

In an advantageous embodiment of the present invention the adaptive voltage scaling (AVS) system comprises a plurality of Hardware Performance Monitors (HPMs) for use with an Advanced Power Controller (APC) and a System-on-a-Chip (SoC). Each Hardware Performance Monitor (HPM) is associated with one of the plurality of threshold voltage $V_T$ logic libraries.

Each Hardware Performance Monitor (HPM) provides a signal that measures a performance of its respective threshold voltage $V_T$ logic library die temperature, process corner and supply voltage. The difference between the measured performance and a nominal expected performance for each Hardware Performance Monitor (HPM) is determined. Then the largest of the plurality of difference signals is selected and provided to the Advanced Power Controller (APC) for use in providing adaptive voltage scaling for the system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 4 through 8 and the various embodiments used to describe the principles of the present invention in this patent document are by way of illustration only and should not be construed in any way to limit the scope of the invention. Those skilled in the art will understand that the principles of the present invention may be implemented in any type of suitably arranged adaptive voltage scaling system.

The present invention solves the problems that exist in the prior art by connecting a plurality of Hardware Performance Monitors (HPMs) to the control loop of the adaptive voltage scaling (AVS) system. One Hardware Performance Monitor (HPM) is provided for each different $V_T$ logic library in the system. For example, in the case of a dual $V_T$ design, two Hardware Performance Monitors (HPMs) are provided. The first Hardware Performance Monitor (HPM-1) is made of low $V_T$ logic cells and the second Hardware Performance Monitor (HPM-2) is made of high $V_T$ logic cells. Three Hardware Performance Monitors (HPMs) are provided for designs that have three different $V_T$ logic libraries, and so on.

Figure 6:
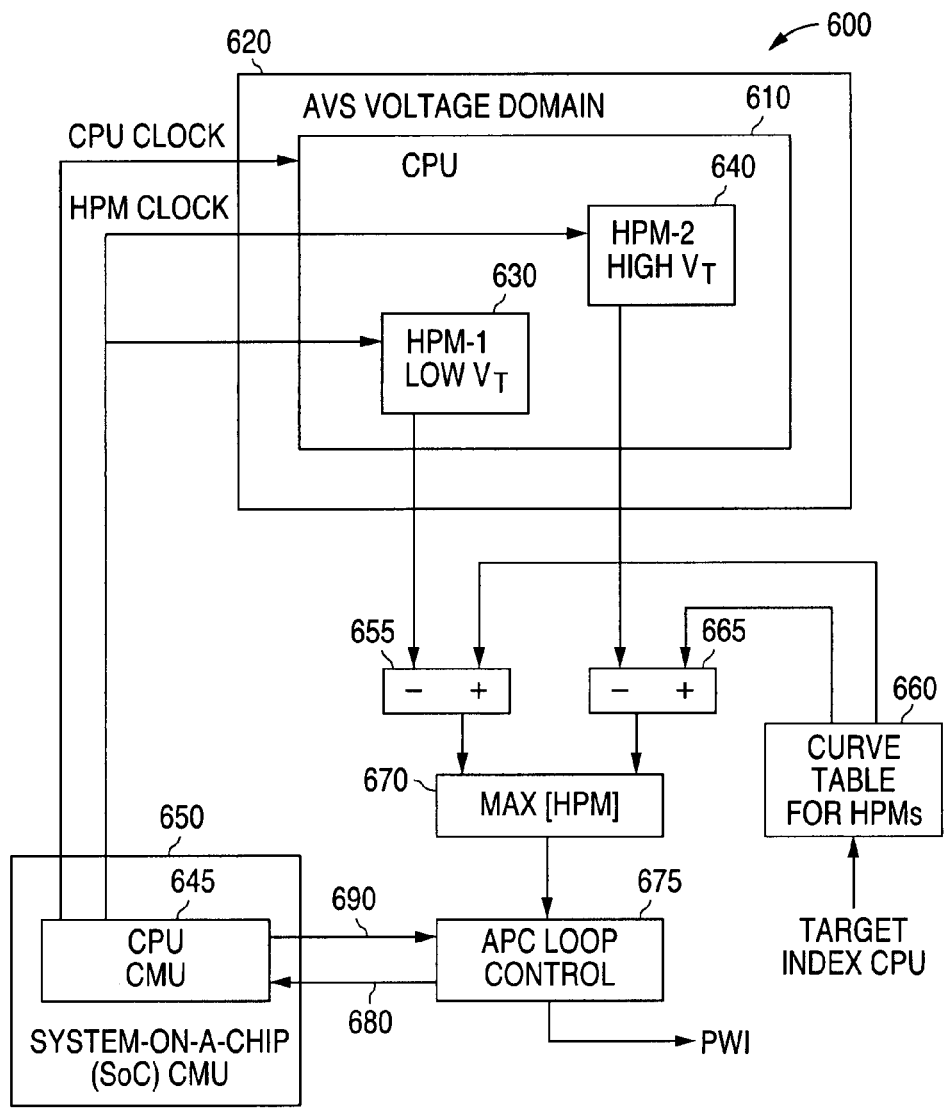
FIG. 6 is a block diagram illustrating an advantageous embodiment of the present invention showing an adaptive voltage scaling system that uses two logic libraries in a system that implements a central processing unit (CPU) inside an adaptive voltage domain.
Figure 3:
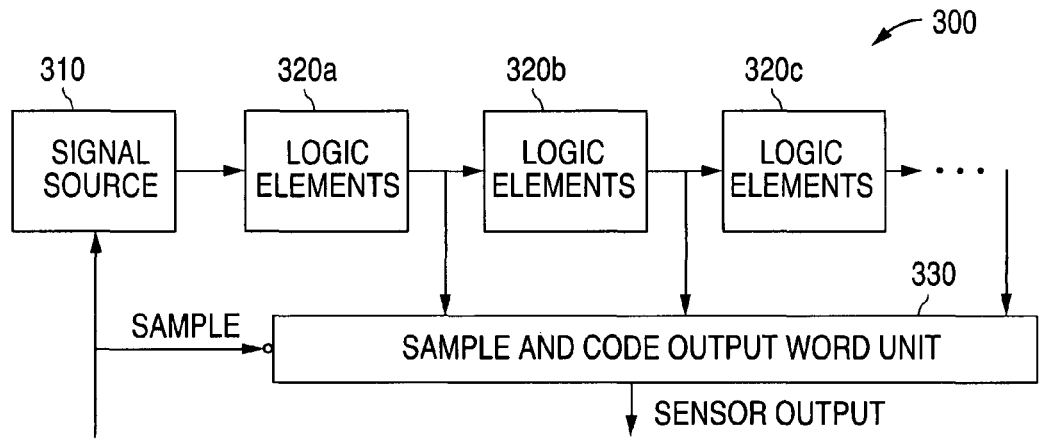
FIG. 3 is a block diagram illustrating a second prior art implementation of a Hardware Performance Monitor (HPM) comprising a tapped delay line.

FIG. 6 is a block diagram 600 illustrating an advantageous embodiment of the present invention showing an adaptive voltage scaling (AVS) system that uses two logic libraries (low $V_T$ and high $V_T$) in a system that implements a central processing unit (CPU) 610 inside an adaptive voltage domain 620. The first Hardware Performance Monitor (HPM-1) 630 is implemented with the low $V_T$ logic library. The second Hardware Performance Monitor (HPM-2) 640 is implemented with the high $V_T$ logic library.

Each Hardware Performance Monitor (HPM) will detect the process and temperature effects on its particular $V_T$ logic library and all paths containing logic cells from that particular $V_T$ logic library. Because there will be (with very high likelihood) paths that consist of only single $V_T$ logic cells in any design, the Hardware Performance Monitor (HPM) that is made of that same $V_T$ logic library will model these paths correctly. Any logic paths that contain logic cells with several $V_T$s are bounded by the single $V_T$ logic path performance. Their performance always falls between the logic performance curves of the paths having only single $V_T$ logic cells.

As shown in FIG. 6, the CPU 610 receives a CPU reference clock signal (CPU CLOCK) from the CPU Clock Management Unit (CMU) 645 within the System-on-a-Chip (SoC) Clock Management Unit (CMU) 650. The first Hardware Performance Monitor (HPM-1) 630 and the second Hardware Performance Monitor (HPM-2) 640 each receive a HPM reference clock signal (HPM CLOCK) from the from the CPU Clock Management Unit (CMU) 645 within the System-on-a-Chip (SoC) Clock Management Unit (CMU) 650.

Figure 1:
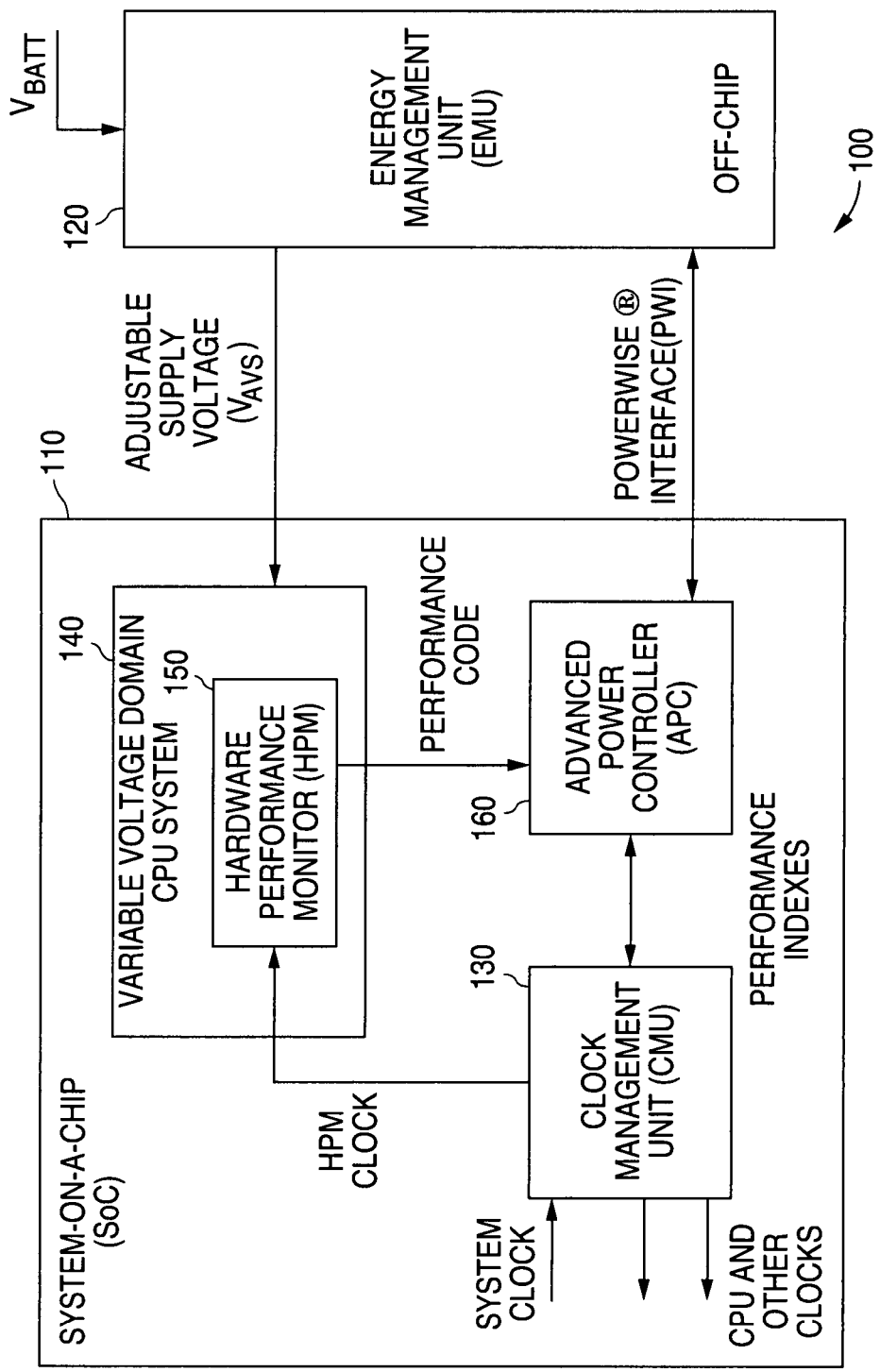
FIG. 1 is a block diagram illustrating an exemplary prior art adaptive voltage scaling (AVS) system.
Figure 2:
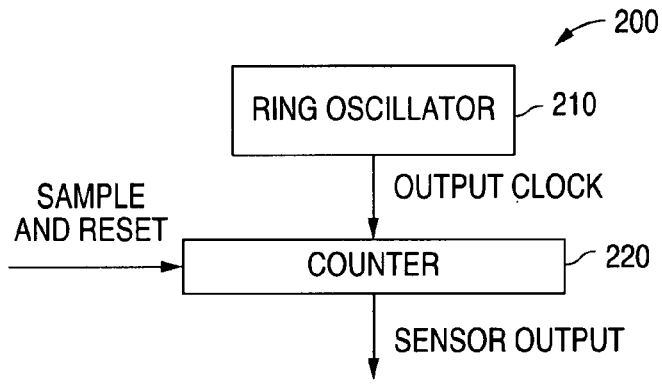
FIG. 2 is a block diagram illustrating a first prior art implementation of a Hardware Performance Monitor (HPM) comprising a ring oscillator and a counter.

The first Hardware Performance Monitor (HPM-1) 630 and the second Hardware Performance Monitor (HPM-2) 640 each produce an output that is relative to the performance of its respective $V_T$ logic library, die temperature, process corner and supply voltage. As will be described more fully below, the outputs of the two Hardware Performance Monitors (630 and 640) are compared in real time to their respective nominal expected outputs. The Hardware Performance Monitor whose output indicates a requirement for a higher supply voltage is used to control the voltage regulator of the AVS system (i.e., the off-chip Energy Management Unit (EMU) shown in FIG. 1).

As shown in FIG. 6, the output of the first Hardware Performance Monitors (HPM-1) 630 is provided to a first subtraction unit 655. First subtraction unit 655 also receives a value that represents the nominal expected output of the first Hardware Performance Monitor (HPM-1) 630 from a curve table unit 660.

Curve table unit 660 contains the nominal expected values for each of the Hardware Performance Monitors (HPMs). Two curves need to be tabulated for a dual $V_T$ design because, as previously described, the two $V_T$ logic libraries (low $V_T$ and high $V_T$) have different characteristics. An additional curve is needed for each additional $V_T$ logic library in a multi $V_T$ design. A value of the target index for the CPU is provided to the curve table unit 660.

As also shown in FIG. 6, the output of the second Hardware Performance Monitors (HPM-2) 640 is provided to second subtraction unit 655. Second subtraction unit 655 also receives a value that represents the nominal expected output of the second Hardware Performance Monitor (HPM-2) 640 from curve table unit 660.

The first subtraction unit 655 subtracts the output of the first Hardware Performance Monitor (HPM-1) 630 from the nominal expected output of the first Hardware Performance Monitor (HPM-1) 630 from curve table unit 660. The output of the first subtraction unit 655 is provided to a comparator unit 670 (designated MAX [HPM] in FIG. 6).

The second subtraction unit 665 subtracts the output of the second Hardware Performance Monitor (HPM-2) 640 from the nominal expected output of the second Hardware Performance Monitor (HPM-2) 640 from curve table unit 660. The output of the second subtraction unit 655 is also provided to the comparator unit 670.

Comparator unit 670 compares in real time the input value from the first subtraction unit 655 and the input value from the second subtraction 665. Comparator unit 670 selects the signal from the Hardware Performance Monitor (HPM) that has the larger value. The comparator unit 670 then outputs the selected signal to the Advanced Power Controller (APC) loop control unit 675.

From this point the adaptive voltage scaling (AVS) system works in exactly the same manner as in the case of a single Hardware Performance Monitor (HPM) operating with a single $V_T$ library. The Advanced Power Controller (APC) loop control unit 675 provides the PowerWise® interface (PWI) signal to the off-chip Energy Management Unit (EMU) (not shown in FIG. 6). The Advanced Power Controller (APC) loop control unit 675 also provides the current index CPU (designated with reference numeral 680) to the CPU Clock Management Unit (CMU) 645. The Advanced Power Controller (APC) loop control unit 675 also receives the target index CPU (designated with reference numeral 690) from the CPU Clock Management Unit (CMU) 645.

In a Dynamic Frequency Scaling (DFS) system the high $V_T$ logic paths become completely dominant at lower frequencies. This may be clearly seen by referring to the graph in FIG. 4 and the graph in FIG. 5. The reason is that the relative delay (compared to the nominal case) of a logic cell with higher $V_T$ transistors increases much faster than that of a logic cell with lower $V_T$ transistors. Therefore, the paths consisting of high $V_T$ logic cells are finally completely dominant at the lower frequencies.

At these lower frequencies only a high $V_T$ Hardware Performance Monitor (HPM) may be used with the Advanced Power Controller (APC). The system of the present invention that uses a plurality of Hardware Performance Monitors (HPMs) will operate satisfactorily at these lower frequencies, but the output of the low $V_T$ Hardware Performance Monitor (HPM) will always be dropped in the comparison that is made by comparison unit 670.

FIG. 6 has described an advantageous embodiment of the present invention for the case of a dual $V_T$ design. However, it is understood that the present invention is not limited to use in a dual $V_T$ design and that any number of $V_T$ domains may be implemented. This principle is illustrated in FIG. 7.

Figure 7:
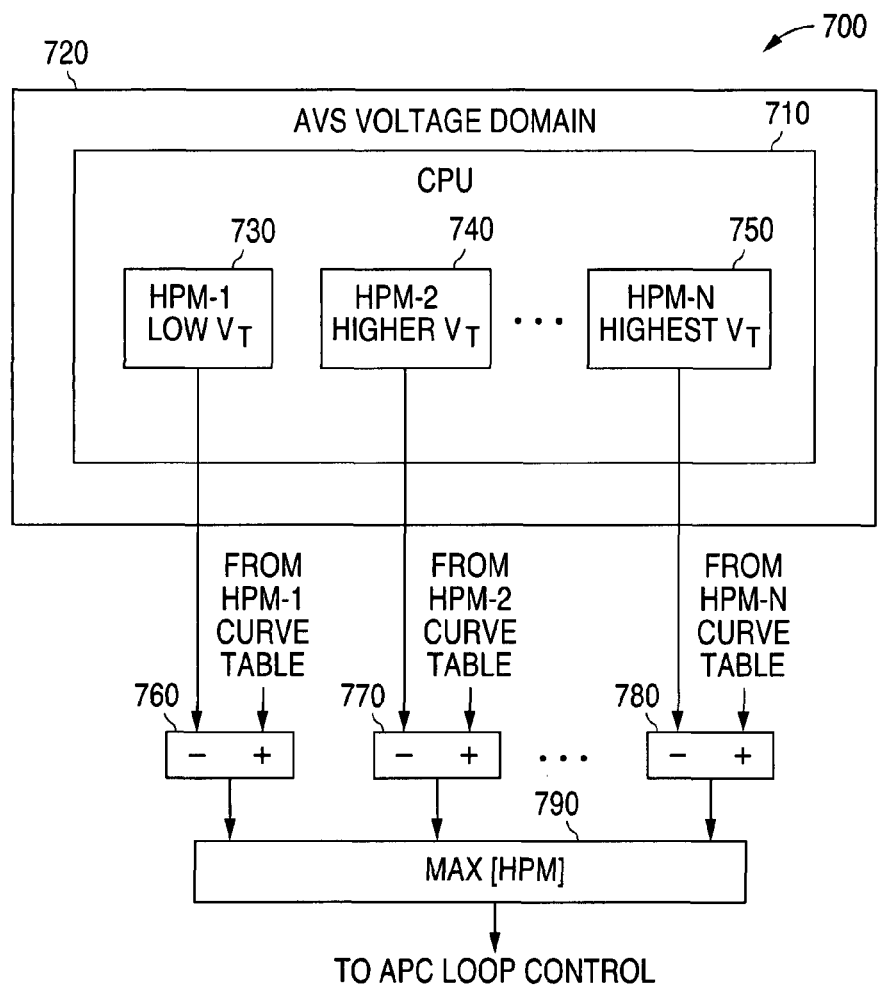
FIG. 7 is a block diagram illustrating an advantageous embodiment of the present invention showing a portion of an adaptive voltage scaling system that uses a plurality of logic libraries in a system that implements a central processing unit (CPU) inside an adaptive voltage domain.
Figure 4:
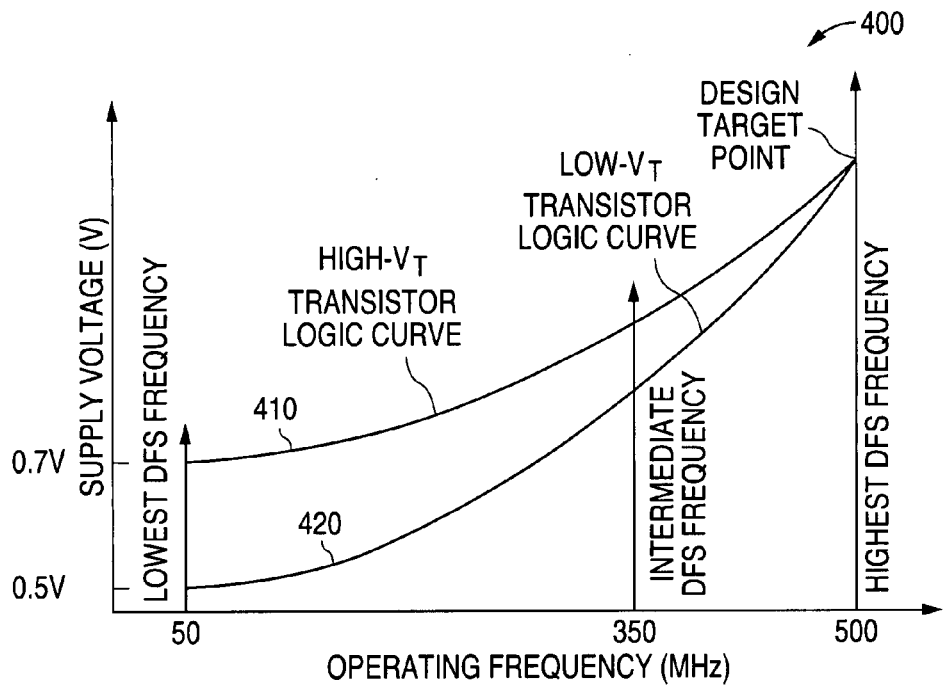
FIG. 4 is a graph of supply voltage versus operating frequency for a dual $V_T$ design.
Figure 5:
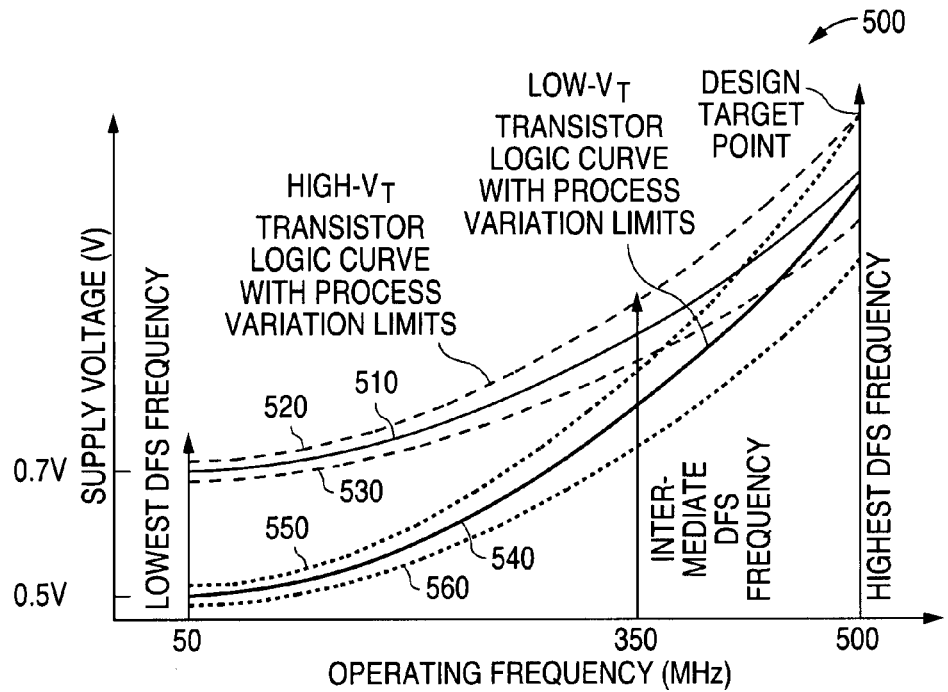
FIG. 5 is a graph of supply voltage versus operating frequency for a dual $V_T$ design showing the impact of process and temperature variation.

FIG. 7 is a block diagram 700 illustrating an advantageous embodiment of the present invention showing a portion of an adaptive voltage scaling system that uses a plurality of logic libraries in a system that implements a central processing unit (CPU) 710 inside an adaptive voltage domain 720. This embodiment comprises a plurality of Hardware Performance Monitors (HPMs) (730, 740, ..., 750).

As shown in FIG. 7, the first Hardware Performance Monitor (HPM-1) 730 is associated with a low $V_T$ logic library. The second Hardware Performance Monitor (HPM-2) 740 is associated with a higher $V_T$ logic library. The last (or Nth) Hardware Performance Monitor (HPM-N) 750 is associated with the highest $V_T$ logic library.

The first Hardware Performance Monitor (HPM-1) 730 provides an output to a first subtraction unit 760. The first subtraction unit 760 also receives a value that represents the nominal expected output of the first Hardware Performance Monitor (HPM-1) 730 from an HPM-1 curve table (not shown in FIG. 7).

The first subtraction unit 760 subtracts the output of the first Hardware Performance Monitor (HPM-1) 730 from the nominal expected output of the first Hardware Performance Monitor (HPM-1) 730 from the HPM-1 curve table. The output of the first subtraction unit 760 is provided to a comparator unit 790 (designated MAX [HPM] in FIG. 7).

The second Hardware Performance Monitor (HPM-2) 740 provides an output to a second subtraction unit 770. The second subtraction unit 770 also receives a value that represents the nominal expected output of the second Hardware Performance Monitor (HPM-2) 740 from an HPM-2 curve table (not shown in FIG. 7).

The second subtraction unit 770 subtracts the output of the second Hardware Performance Monitor (HPM-2) 740 from the nominal expected output of the second Hardware Performance Monitor (HPM-2) 740 from the HPM-2 curve table. The output of the second subtraction unit 770 is provided to the comparator unit 790.

Lastly, the last (or Nth) Hardware Performance Monitor (HPM-N) 750 provides an output to a last (or Nth) subtraction table 780. The last subtraction unit 780 also receives a value that represents the nominal expected output of the last (or Nth) Hardware Performance Monitor (HPM-N) 750 from an HPM-N curve table (not shown in FIG. 7).

The last subtraction unit 780 subtracts the output of the last (or Nth) Hardware Performance Monitor (HPM-N) 750 from the nominal expected output of the last (or Nth) Hardware Performance Monitor (HPM-N) 750 from the HPM-N curve table. The output of the last subtraction unit 780 is provided to the comparator unit 790.

Comparator unit 790 compares in real time the input value from the first subtraction unit 760 and the input value from the second subtraction unit 770 and from all the other subtraction units up to and including the last subtraction unit 780. Comparator unit 790 selects the signal from the Hardware Performance Monitor (HPM) that has the larger value. The comparator unit 790 then outputs the selected signal to an Advanced Power Controller (APC) loop control unit (not shown in FIG. 7). This embodiment illustrates that the present invention may employ any desired number of Hardware Performance Monitors (HPMs).

Figure 8:
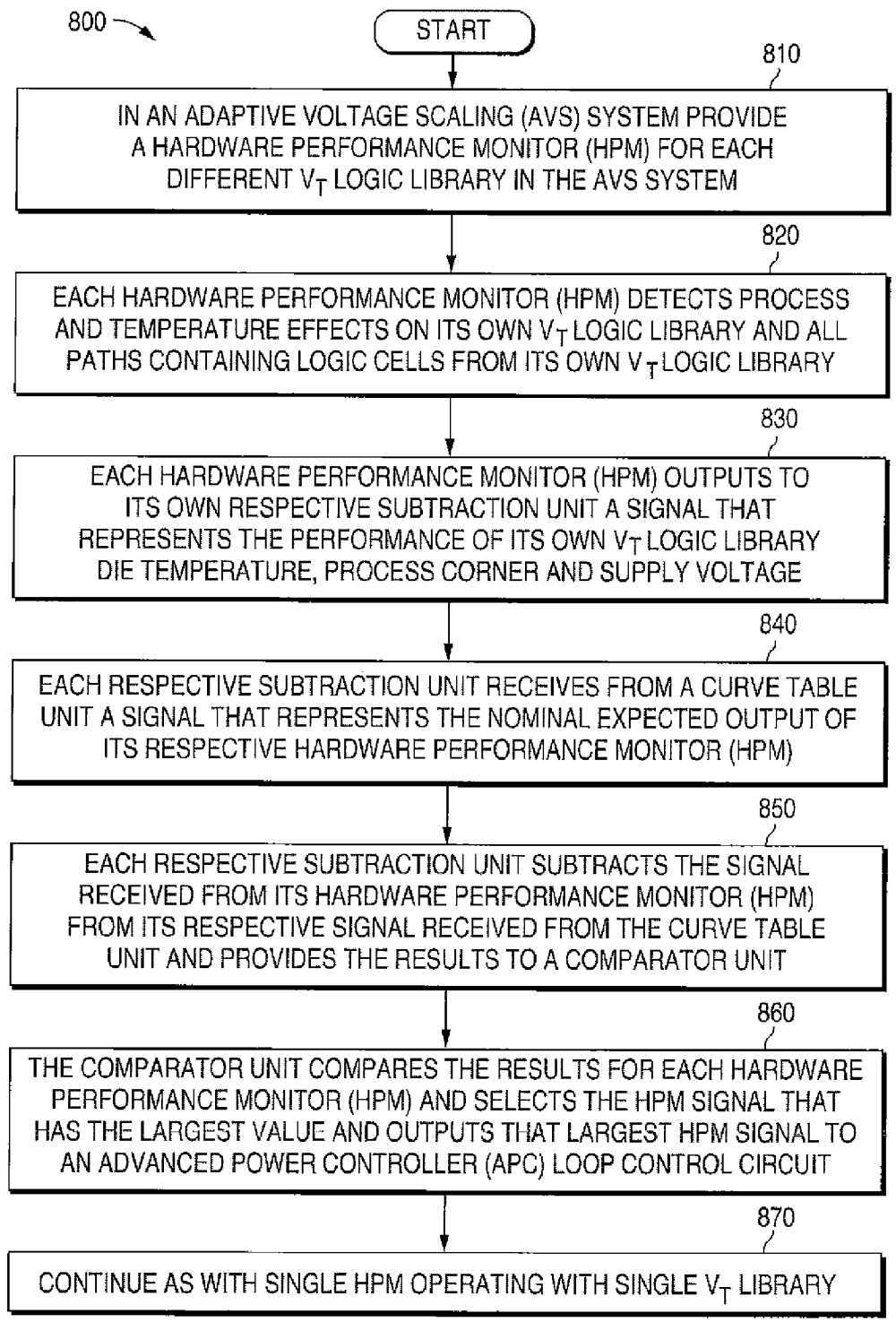
FIG. 8 is a flow chart illustrating an advantageous embodiment of a method of the invention.

FIG. 8 is a flow chart 800 illustrating an advantageous embodiment of a method of the invention. In an adaptive voltage scaling (AVS) system a Hardware Performance Monitor (HPM) is provided for each different $V_T$ logic library in the AVS system (step 810). Each Hardware Performance Monitor (HPM) detects process and temperature effects on its own $V_T$ logic library and all paths containing logic cells from its own $V_T$ logic library (step 820).

Each Hardware Performance Monitor (HPM) outputs to its own respective subtraction unit a signal that represents the performance of its own $V_T$ logic library, die temperature, process corner and supply voltage (step 830). Each respective subtraction unit receives from a curve table unit a signal that represents the nominal expected output of its respective Hardware Performance Monitor (HPM) (step 840).

Each respective subtraction unit subtracts the signal received from its Hardware Performance Monitor (HPM) from its respective signal received from the curve table unit and provides the result to a comparator unit (step 850). The comparator unit compares the results from each Hardware Performance Monitor (HPM) and selects the HPM signal that has the largest value and outputs that largest HPM signal to an Advanced Power Controller (APC) loop control circuit (step 860). From this point the adaptive voltage scaling (AVS) system works in exactly the same manner as in the case of a single Hardware Performance Monitor (RPM) operating with a single $V_T$ library (step 870).

Although the present invention has been described with several embodiments, various changes and modifications may be suggested to one skilled in the art. It is intended that the present invention encompass such changes and modifications as fall within the scope of the appended claims.

What is claimed is:

1. An apparatus for providing adaptive voltage scaling for an integrated circuit system, the integrated circuit system comprising a first plurality of transistors having a first threshold voltage characteristic and a second plurality of transistors having a second threshold voltage characteristic, the apparatus comprising:
a first hardware performance monitor associated with the first threshold voltage characteristic and a first threshold voltage logic library;
a second hardware performance monitor associated with the second threshold voltage characteristic and a second threshold voltage logic library;
a comparator configured to receive signals that are based on output signals from the hardware performance monitors and to select one of the received signals; and
an advanced power controller configured to receive the selected signal from the comparator and to provide adaptive voltage scaling for the integrated circuit system based on the selected signal.

2. The apparatus as set forth in claim 1, wherein each hardware performance monitor is configured to detect process and temperature effects for its associated threshold voltage logic library.

3. An apparatus for providing adaptive voltage scaling for an integrated circuit system, the apparatus comprising:
a plurality of hardware performance monitors, each hardware performance monitor associated with one of a plurality of threshold voltage logic libraries and configured to detect process and temperature effects for its associated threshold voltage logic library; and
a plurality of subtraction units, each subtraction unit having a first input and a second input, wherein the first input of each subtraction unit is coupled to an output of an associated one of the hardware performance monitors.

4. The apparatus as set forth in claim 3, further comprising a curve table unit having an output coupled to the second input of each subtraction unit.

5. The apparatus as set forth in claim 4, wherein each subtraction unit is configured to:
receive, on its first input, a first signal from its associated hardware performance monitor, wherein the first signal represents a performance of its associated threshold voltage logic library die temperature, process corner and supply voltage;
receive, on its second input, a second signal from the curve table unit, wherein the second signal represents a nominal expected performance of its associated hardware performance monitor; and
output a third signal that represents a difference between the second signal and the first signal.

6. The apparatus as set forth in claim 5, further comprising a comparator unit having a plurality of comparator inputs;
wherein each comparator input is coupled to an output of one of the subtraction units; and
wherein the comparator unit is configured to receive a plurality of signals from the subtraction units and select a largest value signal from the plurality of signals.

7. The apparatus as set forth in claim 6, further comprising an advanced power controller having an input coupled to an output of the comparator unit, wherein the advanced power controller is configured to receive the largest value signal from the comparator unit for use in providing adaptive voltage scaling.

8. A system comprising:
an integrated circuit system comprising a first plurality of transistors having a first threshold voltage characteristic and a second plurality of transistors having a second threshold voltage characteristic; and
an adaptive voltage scaling system comprising:
a first hardware performance monitor associated with the first threshold voltage characteristic and a first threshold voltage logic library;
a second hardware performance monitor associated with the second threshold voltage characteristic and a second threshold voltage logic library;
a comparator configured to receive signals that are based on output signals from the hardware performance monitors and to select one of the received signals; and
an advanced power controller configured to receive the selected signal from the comparator and to perform adaptive voltage scaling for the integrated circuit system based on the selected signal.

9. The system as set forth in claim 8, wherein each hardware performance monitor is configured to detect process and temperature effects for its associated threshold voltage logic library.

10. An adaptive voltage scaling system, comprising:
a plurality of hardware performance monitors, wherein each hardware performance monitor is associated with one of a plurality of threshold voltage logic libraries and configured to detect process and temperature effects for its respective threshold voltage logic library;
a plurality of subtraction units, each subtraction unit having a first input and a second input, wherein the first input of each subtraction unit is coupled to an output of an associated one of the hardware performance monitors; and
an advanced power controller configured to perform adaptive voltage scaling based on outputs of the subtraction units.

11. The adaptive voltage scaling system as set forth in claim 10, further comprising a curve table unit having an output coupled to the second input of each subtraction unit.

12. The adaptive voltage scaling system as set forth in claim 11, wherein each subtraction unit is configured to:
receive, on its first input, a first signal from its associated hardware performance monitor, wherein the first signal represents a performance of its associated threshold voltage logic library die temperature, process corner and supply voltage;
receive, on its second input, a second signal from the curve table unit, wherein the second signal represents a nominal expected performance of its associated hardware performance monitor; and
output a third signal that represents a difference between the second signal and the first signal.

13. The adaptive voltage scaling system as set forth in claim 12, further comprising a comparator unit having a plurality of comparator inputs;
wherein each comparator input is coupled to an output of one of the subtraction units; and
wherein the comparator unit is configured to receive a plurality of signals from the subtraction units and select a largest value signal from the plurality of signals.

14. The adaptive voltage scaling system as set forth in claim 13, wherein the advanced power controller has an input coupled to an output of the comparator unit, wherein the advanced power controller is configured to receive the largest value signal from the comparator unit for use in providing the adaptive voltage scaling.

15. A method for providing adaptive voltage scaling for an integrated circuit system comprising a first plurality of transistors having a first threshold voltage characteristic and a second plurality of transistors having a second threshold voltage characteristic, the method comprising:
   providing a first hardware performance monitor associated with the first threshold voltage characteristic and a first threshold voltage logic library;
   providing a second hardware performance monitor associated with the second threshold voltage characteristic and a second threshold voltage logic library;
   detecting in each of the first and second hardware performance monitors process and temperature effects for its associated threshold voltage characteristic and threshold v logic library;
   in a comparator, receiving signals that are based on output signals from the hardware performance monitors and selecting one of the received signals; and
   in an advanced power controller, receiving the selected signal from the comparator and providing adaptive voltage scaling for the integrated circuit system based on the selected signal.

16. A method for providing adaptive voltage scaling for an integrated circuit system, the method comprising:
   providing a plurality of hardware performance monitors, wherein each hardware performance monitor is associated with one of a plurality of threshold voltage logic libraries;
   providing a plurality of subtraction units, each subtraction unit having a first input and a second input, wherein the first input of each subtraction unit is coupled to an output of an associated one of the hardware performance monitors;
   providing a curve table unit having an output coupled to the second input of each subtraction unit; and
   detecting in each hardware performance monitor process and temperature effects for its associated threshold voltage logic library.

17. The method as set forth in claim 16, further comprising:
   receiving in each subtraction unit, on its first input, a first signal from its associated hardware performance monitor, wherein the first signal represents a performance of its associated threshold voltage logic library die temperature, process corner and supply voltage;
   receiving in each subtraction unit, on its second input, a second signal from the curve table unit, wherein the second signal represents a nominal expected performance of its associated hardware performance monitor; and
   determining in each subtraction unit a third signal that represents a difference between the second signal and the first signal.

18. The method as set forth in claim 17, further comprising:
   providing a comparator unit having a plurality of comparator inputs, wherein each comparator input is coupled to an output of one of the subtraction units;
   receiving within the comparator unit a plurality of signals from the plurality of subtraction units;
   selecting within the comparator unit a largest value signal from the plurality of signals; and
   providing the largest value signal to an advanced power controller for use in providing adaptive voltage scaling.

19. The apparatus as set forth in claim 1, further comprising:
   a plurality of subtraction units, each subtraction unit having a first input and a second input, wherein the first input of each subtraction unit is coupled to an output of an associated one of the hardware performance monitors, and wherein outputs of the subtraction units are coupled to the comparator.

20. The system as set forth in claim 8, wherein the adaptive voltage scaling system further comprises:
   a plurality of subtraction units, each subtraction unit having a first input and a second input, wherein the first input of each subtraction unit is coupled to an output of an associated one of the hardware performance monitors, and wherein outputs of the subtraction units are coupled to the comparator.

* * * * *